United States Patent [19]

Williams

[11] 4,166,815

[45] Sep. 4, 1979

[54] DIALKYLTIN BIS(3-SULFOLANYLMERCAPTIDES) AS THERMAL STABILIZERS FOR POLYVINYL CHLORIDE

[75] Inventor: Ralph P. Williams, Bartlesville, Okla.

[73] Assignee: Phillips Petroleum Company, Bartlesville, Okla.

[21] Appl. No.: 871,660

[22] Filed: Jan. 23, 1978

[51] Int. Cl.$^2$ .................. C08K 5/58; C07D 333/48
[52] U.S. Cl. ............................ 260/45.75 S; 549/3
[58] Field of Search ............ 260/45.75 S, 332.1, 260/45.75 Q

[56] References Cited

U.S. PATENT DOCUMENTS

| | | | |
|---|---|---|---|
| 3,398,160 | 8/1968 | Martel et al. | 260/327 TH |
| 3,804,871 | 4/1974 | Buchholz | 260/45.75 S |
| 3,833,543 | 9/1974 | Guthrie et al. | 424/245 |

Primary Examiner—Veronica P. Hoke

[57] ABSTRACT

Dialkyltin bis(3-sulfolanylmercaptides) have been found to be excellent stabilizers against heat degradation of halogen-containing polymer, e.g., polyvinyl chloride. New tin-containing compounds are disclosed along with a process for making the same.

11 Claims, No Drawings

DIALKYLTIN BIS(3-SULFOLANYLMERCAPTIDES) AS THERMAL STABILIZERS FOR POLYVINYL CHLORIDE

This invention relates to the stabilization against heat degradation of a halogen-containing polymer, e.g., polyvinyl chloride. In one of its aspects the invention provides a new stabilizer against heat degradation of halogen-containing polymers or materials, e.g., polyvinyl chloride. In a more specific aspect of the invention it relates to stabilizing a halogen-containing polymer or material, e.g., polyvinyl chloride against darkening or against becoming unduly brittle due to heat exposure. In another aspect of the invention it relates to a new compound of tin. In a further aspect of the invention it relates to a process for preparing said new compound of tin.

In one of its concepts the invention provides a halogen-containing polymer or material stabilized against heat degradation composited with a dialkyltin bis(3-sulfolanylmercaptide). In another of its concepts the invention provides a method for stabilizing a halogen-containing polymer or material which comprises incorporating the said material together with a dialkyltin bis(3-sulfolanylmercaptide). In a more specific concept of the invention it provides a new composition of matter comprising essentially a halogen-containing polymer composited with a suitable amount of a dialkyltin bis(3-sulfolanylmercaptide) to render the composition stable against heat degradation. In a still more specific concept of the invention it provides a stabilized polyvinyl chloride and a method for stabilizing the same. In still another of its concepts the invention provides as a new compound a dialkyltin bis(3-sulfolanylmercaptide). In a further concept still it provides a method for making said new compound.

It is known that various halogen-containing resins, particularly vinyl halide resins, including homopolymers of vinyl chloride and copolymers of vinyl chloride with other monomers, degrade when subjected to heat over an extended period of time, as evidenced by darkening of the resin and by an increase in its brittleness. These characteristics may render the resin unsuitable for many uses. The darkening produces an unsightly appearance. The increased brittleness may cause mechanical failures. A wide variety of materials has heretofore been employed to stabilize halogen-containing resins against degradation. Many additives have achieved some measure of success in stabilizing halogen-containing resins against the degradative action of heat, but there are many applications in which a greater degree of heat stability is desired than has heretofore been possible to obtain.

An object of the invention is to provide a composition stabilized against heat degradation, said composition containing a halogen-containing polymer. Another object of the invention is to provide a method for stabilizing a halogen-containing polymer against heat degradation, e.g., darkening, brittleness, etc. A further object of the invention is to provide a thermal stabilizer for a resin subject to heat degradation as evidenced by color change, brittleness, etc. A further object of the invention, still, is to provide a stabilized polyvinyl chloride which will not darken and/or become unduly brittle when exposed to heat over extended periods of time. It is another object of this invention to provide a new compound of tin, suitable for use as a stabilizer for a heat-degradable polymer. A still further object is to provide a process for producing said new compound.

I have now discovered that dialkyltin bis(3-sulfolanylmercaptide) is an excellent stabilizer for a polymer such as polyvinyl chloride to stabilize the same against heat degradation as evidenced by color change and/or undue brittleness, etc.

Other aspects, concepts, objects and several advantages of this invention are apparent from a study of this disclosure and the appended claims.

According to the present invention a dialkyltin bis(3-sulfolanylmercaptide) is incorporated together with a halogen-containing polymer or material to render the same stable against heat degradation.

Also according to this invention there is provided a new composition comprising essentially a halogen-containing polymer which normally is heat degraded, as evidenced by color change and/or undue brittleness, etc., and a dialkyltin bis(3-sulfolanylmercaptide). Also according to this invention there is provided a new tin-containing compound, e.g., dialkyltin bis(3-sulfolanylmercaptide), e.g., the reaction product of, say, dibutyltin oxide and 3-mercaptosulfolane, e.g., di-n-butyltin bis(3-sulfolanylmercaptide). Further the invention provides the process of preparing these new compounds.

The thermal stabilizer of the invention can be incorporated into the resin to be stabilized in any manner convenient to those skilled in the art. Generally, this type of compounding is carried out by intimately mixing the stabilizer and resin on a heated roll-mill, the temperature on the surface roll mill usually being in the approximate range of 163° C. (325° F.) to 177° C. (350° F.).

The effective amount of the dialkyltin bis(3-sulfolanylmercaptides) stabilizer in a vinyl halide resin will be generally in the approximate range of 0.1 to 10 parts by weight per hundred resin (phr) with a preferred range of approximately 0.5 to 5 phr. The optimum proportion for each resin and each use can be determined by routine test.

The dialkyltin bis(3-sulfolanylmercaptides) of the invention are particularly useful as thermal stabilizers for halogen-containing resins such as polyvinyl chloride, polyvinyl fluoride, polyvinylidene chloride, polyvinylidene fluoride, polytrifluoroethylene, and polytetrafluoroethylene, either alone or for copolymers made with the monomers from which these homopolymers have been prepared with copolymerizable monomers such as vinyl acetate, ethyl acrylate, acrylonitrile, etc. Halogenated polyethers and halogenated rubbers are also considered to be materials to which the current invention applies.

The dialkyltin bis(3-sulfolanylmercaptide) of the invention can be prepared by the reaction of a suitable dialkyltin oxide and a suitable mercapto substituted 5-membered cyclic sulfone. The new compounds can be incorporated into vinyl halide resin compositions to provide thermal stability thereto. The novel organotin compounds of the invention have tin-sulfur linkages and 5-membered cyclic sulfone groups, which compounds may be used as stabilizers for resins. This invention provides a process for preparing these novel compounds. Still another embodiment of this invention provides halogen-containing resins particularly stable against heat deterioration.

The dialkyltin bis(3-sulfolanylmercaptides) employed in this invention are sometimes referred to as dialkyltin bis(3-tetramethylene-sulfonylmercaptides), or dialkyltin bis(3-thiophan sulfonylmercaptides) or dialkyltin bis(-tetrahydrothiophene-1,1-dioxide-3-mercaptides), all of which can be represented by the formula:

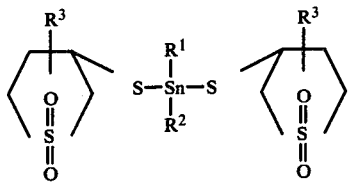

wherein $R^1$ and $R^2$ are selected from the group consisting of linear or branched alkyl and cycloalkyl radicals, and mixtures of the two, containing from 1 to 18 carbon atoms inclusive, and $R^3$ can be hydrogen or an alkyl group having 1 to 4 carbon atoms.

Representative, but not limiting, examples of the compounds of this invention are: dimethyltin bis(3-sulfolanylmercaptide), diethyltin bis(3-sulfolanylmercaptide), di-n-propyltin bis(3-sulfolanylmercaptide), di-isopropyltin bis(3-sulfolanylmercaptide), di-n-butyltin bis(3-sulfolanylmercaptide), ethylbutyltin bis(3-sulfolanylmercaptide), di-n-butyltin bis(4-methylsulfolanyl-3-mercaptide) and the like and mixtures thereof.

The title compounds of this invention are prepared by heating a mercaptan substituted 5-membered cyclic sulfone having the formula:

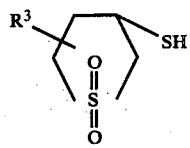

together with a dialkyltin oxide having the formula:

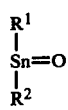

wherein $R^1$, $R^2$ and $R^3$ are as defined earlier.

A hydrocarbon solvent can be used but is not necessarily employed. The hydrocarbon solvent can be any solvent capable of removing the by-product water by azeotrope formation, e.g., benzene, toluene, xylene, etc.

The reactants should be present in a mole ratio of at least 2 moles of the cyclic sulfone to 1 mole of the dialkyltin oxide for best results.

A catalyst is not necessary for this reaction but can be employed if so desired.

The heating is carried out for a time and at a temperature sufficient to produce the desired product. Generally, the temperature will be in the range of from about 68° C. to about 130° C. The reaction time will be in the range of from about 0.5 hrs. to about 5 hrs. Any convenient pressure can be used. A pressure which assists the azeotropic removal of water is particularly convenient, especially when a hydrocarbon solvent is used.

U.S. Pat. No. 3,398,160 issued Aug. 20, 1968 discloses saturated thiapyran-3-one-1,1-dioxides which are derivatives of tetrahydrothiopyran stating that the product may be used as fungicides, insecticides, herbicides and, in the presence of dibutyl tin salts, as stabilizers for polyvinyl chloride.

The following example illustrates the preparation of a new compound of the invention.

EXAMPLE I

Dibutyltin oxide (24.9 grams, 0.1 mole) and 75 milliliters of toluene were combined in a 250 milliliter 3-necked glass flask fitted with a stirrer, Dean-Stark azeotrope trap, condenser, thermometer, and a nitrogen cap. To this mixture was added 3-mercaptosulfolane (30 grams, 0.2 moles) and 25 milliliters of toluene and the total contents stirred and heated at about 110° C. for 5 hours during which time 2.2 milliliters of water was collected in the azeotrope trap. Charcoal (4 grams) was added to the slightly cloudy mixture and stirred at steam bath temperature for one hour after which the contents were filtered through Celite and fritted glass and the solvent vacuum-stripped at about 90°–100° C./0.2 mm to give 54 grams (100 mole % yield) of a thick cloudy looking liquid having the following analysis:

|           | Calculated for $C_{16}H_{32}O_4Sn$ | Found |
|-----------|------------------------------------|-------|
| Carbon-   | 36.03                              | 37.76 |
| Hydrogen- | 6.05                               | 5.94  |
| Oxygen-   | 12.00                              | 11.6  |
| Sulfur-   | 24.04                              | 25.68 |
| Tin-      | 21.88                              | 22.30 |
|           | 100.00                             |       |

EXAMPLE II

The formulation shown below is typical for that used in preparing stabilized resins.

| Formulation |
|---|
| 40 grams Polyvinyl chloride (103, EP-F76, B. F. Goodrich) |
| 0.4 grams Stearic acid |
| 0.8 grams (2 phr) stabilizer |

The above formulation was added to a 2-roll mill (3 inch diameter rolls) at 177° C. (350° F.) and intimately mixed until blended, usually 3 to 5 mins. The sample was removed and approximately 35 grams placed in a 6.35 cm (2.5 in.)×12.7 cm (5 in.)×0.318 cm (0.125 in.) mold which was heat molded in a preheated platen-type press at 185° C. (365° F.) under 142.3 kN (16 tons) ram force for three minutes. The molded sheet was cooled to about 25° C. and cut into strips 0.635 cm (0.25 in.)×3.81 cm (1.5 in.)×0.318 cm (0.125 in.) for thermal testing. Thermal testing was conducted in accordance with ASTMD 2115, "Oven Heat Stability of Polyvinyl chloride Compositions", and consists essentially of heating the sample to the desired test temperature and periodically removing (usually every 20 minutes) for visual observation. The samples were rated from 0 to 10, 0 being a clear non-colored specimen and 10 a very dark (black/brown) colored specimen. Commercial stabilizers used for comparative purposes are shown as follows:

| Compound | Chemical Name | Trade Name | Source |
| --- | --- | --- | --- |
| A | Dibutyltin bis(n-dodecylmercaptide) | Thermolite ® 20 | M&T Chemical Co. |
| B | Dibutyltin bis(acetoxyisooctylenemercaptide) also dibutyltin bis(isooctylmercaptoacetate) | Thermolite 31 | M&T Chemical Co. |
| C | Dioctyltin bis(acetoxyisooctylenemercaptide) also dioctyltin bis(isooctylmercaptoacetate) | Thermolite 831 | M&T Chemical Co. |
| D | Di(tridecyl)tin bis(1-oleoxy-2-ethylenemercaptide)* | Advastab ® 692 | Cincinnati Milacron Chemicals, Inc. |
| E | Di-n-butyltin bis(3-sulfolanylmercaptide) | — | Invention |

*NMR data support this nomenclature but does not confirm it.

The results of this testing using both commercial stabilizers and the inventive stabilizer are shown in 191° C. in the same manner as described in Example II. These results are shown in Table II.

Table II

| | Color Ratings (0 to 10) of PVC Formulations Containing 5 phr Dioctylphthalate and Using Various Stabilizer Compounds | | | | | | | | | | | |
| --- | --- | --- | --- | --- | --- | --- | --- | --- | --- | --- | --- | --- |
| | No Stabilizer | | Stabilizer A | | Stabilizer B | | Stabilizer C | | Stabilizer D | | Stabilizer E | |
| Minutes | 177° C. | 191° C. | 177° C. | 191° C. | 177° C. | 191° C. | 177° C. | 191° C. | 177° C. | 191° C. | 177° C. | 191° C. |
| 0 | 10 | 10 | 3 | 3 | 0 | 0 | 0 | 0 | 0 | 0 | 1 | 1 |
| 20 | — | — | 3 | 3 | 1 | 2 | 1 | 2 | 1 | 10 | 1 | 1 |
| 40 | — | — | 3 | 4 | 2 | 3 | 2 | 3 | 10 | — | 1 | 1 |
| 60 | — | — | 3 | 10 | 2 | 6 | 2 | 10 | — | — | 1 | 2 |
| 80 | — | — | 4 | — | 3 | 10 | 3 | — | — | — | 2 | 4 |
| 100 | — | — | 5 | — | 4 | — | 4 | — | — | — | 2 | 5[a] |
| 120 | — | — | 8 | — | 5 | — | 7 | — | — | — | 3 | — |
| 140 | — | — | 10 | — | 7 | — | 10 | — | — | — | 3 | — |
| 160 | — | — | — | — | 9 | — | — | — | — | — | 4 | — |
| 180 | — | — | — | — | 10 | — | — | — | — | — | 6 | — |
| 200 | — | — | — | — | — | — | — | — | — | — | 7 | — |
| 220 | — | — | — | — | — | — | — | — | — | — | 9 | — |
| 240 | — | — | — | — | — | — | — | — | — | — | 10 | — |

[a]Test discontinued

Table 1.

Table I

| | Color Ratings (0 to 10) of PVC Formulations Using Various Stabilizer Compounds at 177° C. (350° F.) | | | | | |
| --- | --- | --- | --- | --- | --- | --- |
| Minutes | No Stabilizer | Stabilizer A | Stabilizer B | Stabilizer C | Stabilizer D | Stabilizer E |
| 0 | 10 | 2 | 1 | 1 | 1 | 1 |
| 20 | — | 3 | 2 | 2 | 9 | 1 |
| 40 | — | 3 | 2 | 2 | 10 | 1 |
| 60 | — | 3 | 3 | 3 | — | 1 |
| 80 | — | 4 | 3 | 4 | — | 1 |
| 100 | — | 10 | 4 | 10 | — | 3 |
| 120 | — | — | 7 | — | — | 3 |
| 140 | — | — | 9 | — | — | 3 |
| 160 | — | — | 10 | — | — | 4 |
| 180 | — | — | — | — | — | 8 |
| 200 | — | — | — | — | — | 10 |

EXAMPLE III

A small amount of dioctylphthalate (2 grams, 5 parts per hundred PVC) was added to the formulation described in Example II for use as a processing aid. The new formulation was prepared and tested at 177° C. and 191° C. in the same manner as described in Example II. These results are shown in Table II.

EXAMPLE IV

The inventive stabilizer, di-n-butyltin bis(3-sulfolanylmercaptide), contains slightly more tin than contained in the commercial stabilizers tested. Therefore new formulations were prepared where the amount of stabilizer used was adjusted such that the same amount of tin present in each formulation was approximately the same; namely 0.35 phr. This was determined by multiplying the percent tin present in each stabilizer by the phr stabilizer used. For example, 1.89 phr Stabilizer A was used which contains 18.7% tin. Therefore, 1.89 phr × 0.187=0.35 phr tin in formulation. Likewise, 1.59 phr Stabilizer E was used which contains 22.2% tin, thus, 1.59 phr × 0.222=0.35 phr tin in formulation. The formulations were based on 40 grams PVC, 2 grams dioctylphthalate, 0.4 grams stearic acid and X grams of stabilizer. These results are shown in Table III. Stabilizer E shows a 25% improvement at 177° C. over the average of 3 commercial stabilizers tested. This was determined by measuring the difference in time to reach 10; for example, Stabilizer E minus average of 3 commercial stabilizers divided by average of 3 commercial stabilizers.

Table III

Color Ratings (0 to 10) of PVC Formulations Containing Equal Tin Concentration But From Various Stabilizers
Test Temp. 177° C., 350° F.

| Minutes | No Stabilizer | Stabilizer A | Stabilizer B | Stabilizer C | Stabilizer E |
|---|---|---|---|---|---|
| % Sn in Stabilizer: | — | 18.7 | 17.7 | 15.8 | 22.2 |
| phr Stabilizer used: | — | 1.89 | 2.00 | 2.24 | 1.59 |
| 0 | 10 | 3 | 2 | 0 | 1 |
| 20 | — | 3 | 3 | 1 | 1 |
| 40 | — | 3 | 3 | 2 | 1 |
| 60 | — | 4 | 3 | 3 | 2 |
| 80 | — | 4 | 3 | 4 | 2 |
| 100 | — | 5 | 4 | 5 | 2 |
| 120 | — | 8 | 4 | 6 | 4 |
| 140 | — | 10 | 5 | 7 | 5 |
| 160 | — | — | 7 | 10 | 7 |
| 180 | — | — | 10 | — | 9 |
| 200 | — | — | — | — | 10 |

The preceding experimental data illustrate the improved performance of the inventive material, dialkyltin bis(3-sulfolanylmercaptide), over several similar type commercial PVC heat stabilizers. Tables I and II illustrate this improved performance wherein a PVC formulation containing stabilizer E remains colorless at the test temperatures employed longer than the four comparative formulations containing commercial stabilizers. In addition, the time required to reach 10, the maximum color rating indicating extreme degradation, was also longer for the PVC formulation containing the inventive stabilizer, stabilizer E, than for the other formulations tested. Table II indicates the improved performance at both 177° C. (350° F.) and 191° C. (375° F.).

Table III illustrates a still slight improvement when the inventive stabilizer is employed at a concentration lower than that used for the comparative formulation but at the same approximate tin level. The reason for this weight adjustment is because the molecular weight of the inventive stabilizer employed, di-n-butyltin bis(3-sulfolanylmercaptide), is significantly less (533.3) than that for the comparative stabilizers (635.7 for stabilizer A) and, therefore, contains a slightly higher percentage of tin per molecule. Tin, in presence of sulfur, is thought to be the contributing factor in enhancing thermal stability. The mechanism of the action of the inventive stabilizer or that of heretofore used stabilizers is not well understood.

In any event, it is desirable to have as much tin and sulfur per unit of stabilizer employed as possible. This permits the least alteration of the plastics sought to be stabilized. Further, upon temperature increase it is important, according to the present invention, to have along with the lowest practical molecular weight mercapto compound which gives a desirable high amount of tin and sulfur, a compound which will not cause objectionable odor when the stabilizer decomposes.

The 3-mercaptosulfolane, used according to the invention, has a molecular weight of 122 and, therefore, possesses a very low volatility. Further, the reaction product of the tin compound and 3-mercaptosulfolane, used in the examples, has a boiling point of 125° C. at 0.25 millimeters of mercury which corresponds to about 350° C. at 760 millimeters of mercury.

The % improvement at 177° C. obtained with the inventive Stabilizer E was calculated by determining the difference in time to reach 10 between Stabilizer E and the average of the commercial stabilizers tested divided by the average of the commercial stabilizers.

Thus, in Table I, Stabilizer E showed a 100% improvement and in Table II a 92% improvement was observed.

Reasonable variation and modification are possible within the scope of the foregoing disclosure, and the appended claims to the invention the essence of which is that certain new compounds of tin as herein disclosed have been prepared, that a process for preparing the same has been disclosed, and that these compounds have been found suitable to excellently stabilize halogen-containing polymer, e.g., polyvinyl chloride, against heat-degradation.

I claim:

1. A halogen-containing polymer subject to heat degradation stabilized against heat degradation by having incorporated therewith a dialkyltin bis (3-sulfolanylmercaptide) represented by the formula:

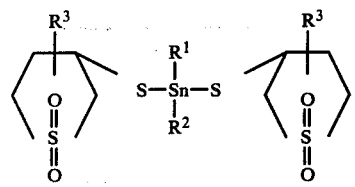

wherein $R^1$ and $R^2$ are selected from the group consisting of linear or branched alkyl and cycloalkyl radicals, and mixtures of the two, containing from 1 to 18 carbon atoms inclusive, and $R^3$ can be hydrogen or an alkyl group having 1 to 4 carbon atoms.

2. A composition according to claim 1 wherein the halogen-containing polymer is polyvinyl chloride.

3. A composition according to claim 1 wherein the halogen-containing polymer is a vinyl halide resin.

4. A composition according to claim 3 wherein the vinyl halide resin is at least one of a homopolymer of vinyl chloride and a copolymer of vinyl chloride with another monomer.

5. A composition according to claim 4 wherein the halogen-containing polymer is vinyl chloride.

6. A method of stabilizing a halogen-containing polymer against heat degradation which comprises incorporating therewith a dialkyltin bis(3-sulfolanylmercaptide) represented by the formula:

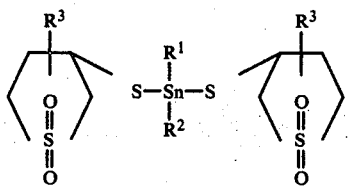

wherein $R^1$ and $R^2$ are selected from the group consisting of linear or branched alkyl and cycloalkyl radicals, and mixtures of the two, containing from 1 to 18 carbon atoms, inclusive, and $R^3$ can be hydrogen or an alkyl group having 1 to 4 carbon atoms.

7. A process according to claim 6 wherein the halogen-containing polymer is polyvinyl chloride.

8. A method according to claim 6 wherein the halogen-containing polymer is a vinyl halide resin.

9. A method according to claim 8 wherein the halogen-containing polymer is at least one of a homopolymer of vinyl chloride and a copolymer of vinyl chloride with another monomer.

10. A method according to claim 9 wherein the halogen-containing polymer is vinyl chloride.

11. A dialkyltin bis(3-sulfolanylmercaptide) represented by the formula:

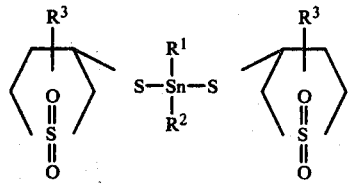

wherein $R^1$ and $R^2$ are selected from the group consisting of linear or branched alkyl and cycloalkyl radicals, and mixtures of the two, containing from 1 to 18 carbon atoms, inclusive, and $R^3$ can be hydrogen or an alkyl group having 1 to 4 carbon atoms.

* * * * *